Figure 1:
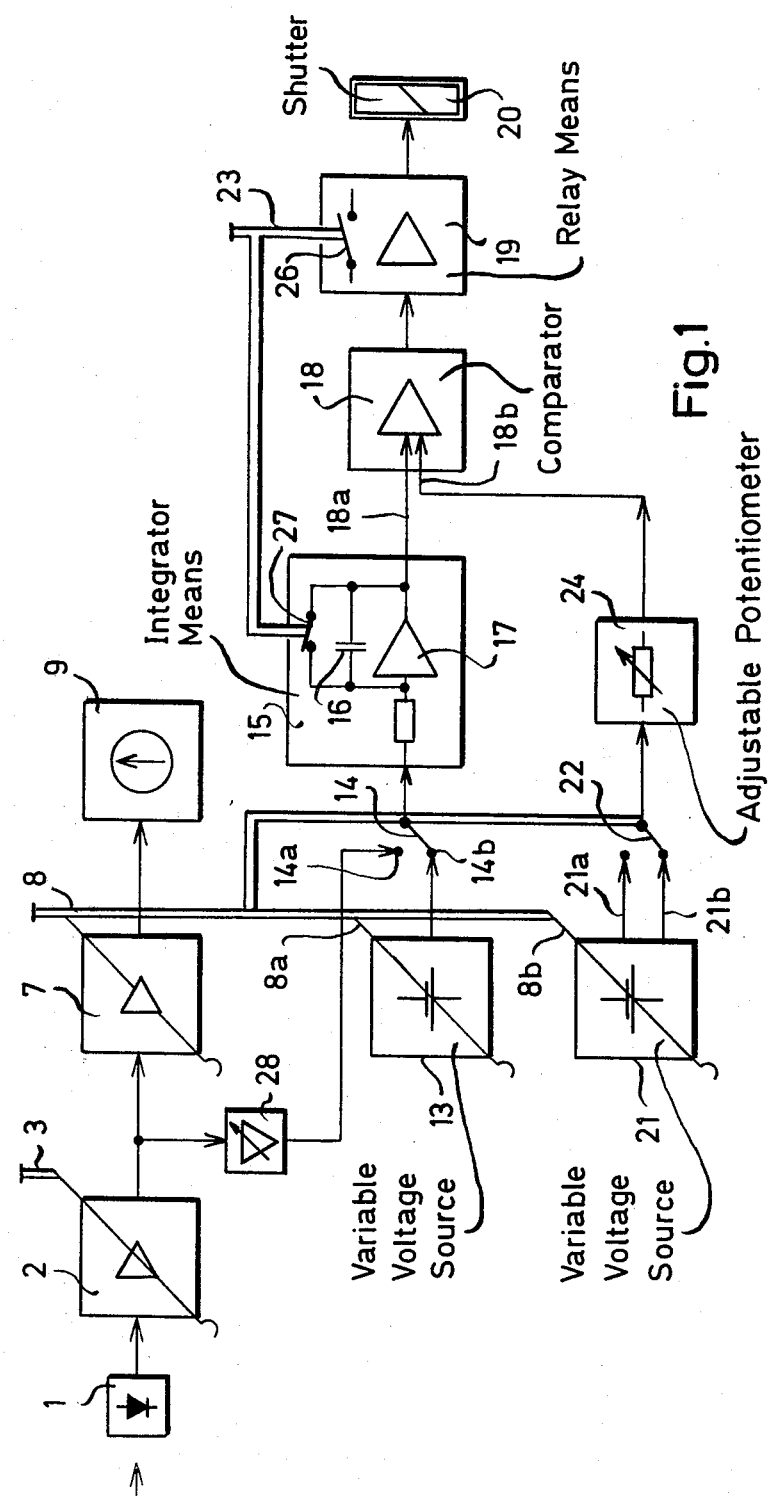

United States Patent [19]

Elger

[11] 4,318,599
[45] Mar. 9, 1982

[54] APPARATUS FOR EXPOSURE CONTROL FOR MICROPHOTOGRAPHY

[75] Inventor: Adolf Elger, Oberkochen, Fed. Rep. of Germany

[73] Assignee: Carl Zeiss-Stiftung, Oberkochen, Fed. Rep. of Germany

[21] Appl. No.: 964,143

[22] Filed: Nov. 28, 1978

[30] Foreign Application Priority Data

Dec. 16, 1977 [DE] Fed. Rep. of Germany ....... 2756137

[51] Int. Cl.³ .............................................. G03B 7/04
[52] U.S. Cl. .................................... 354/51; 354/60 E; 354/79
[58] Field of Search ..................... 354/50, 51, 79, 60 E

[56] References Cited

U.S. PATENT DOCUMENTS

| | | | |
|---|---|---|---|
| 3,386,358 | 5/1968 | Kropp | 354/51 |
| 3,863,263 | 1/1975 | Itagaki | 354/50 |
| 3,936,842 | 2/1976 | Nanba et al. | 354/50 |
| 3,968,502 | 7/1976 | Shiozawa et al. | 354/51 |
| 3,987,463 | 10/1976 | Nishikawa et al. | 354/79 |
| 4,107,707 | 8/1978 | Numata et al. | 354/50 |
| 4,112,446 | 9/1978 | Numata et al. | 354/50 |

Primary Examiner—L. T. Hix
Assistant Examiner—W. J. Brady
Attorney, Agent, or Firm—Hopgood, Calimafde, Kalil, Blaustein & Judlowe

[57] ABSTRACT

The invention contemplates improved exposure-control means for use in microphotography, providing optional availability of semi-automatic exposure control and of automatic exposure control, the arrangement being optionally and selectively applicable to large-frame and to small-frame (miniature) photography, with provision for appropriate compensation for film speed and, in the case of long-duration exposures, for compensating for the Schwarzschild effect.

7 Claims, 2 Drawing Figures

APPARATUS FOR EXPOSURE CONTROL FOR MICROPHOTOGRAPHY

The present invention relates to improved means for exposure control in microphotography.

Microphotographic devices are known in which the exposure time is controlled automatically. But such devices are of limited use, since the observer cannot note what exposure time the automatic system selects, and since the so-called Schwarzschild effect is disturbingly evident in the case of longer exposure times.

These circumstances have led to development of a semi-automatic device which is described in West German Pat. No. 1,288,425. This device makes it possible to switch to a selected one of n exposure times (or steps) which are graduated in accordance with a geometrical series. Within the ray path, there is arranged a suitable receiver the output amplification of which is changed in n manually actuated steps until an indicating instrument shows the desired deflection, i.e., the level needed for the selected exposure time. Synchronously with this, RC members in a timer are displaced in such a manner that, when the desired deflection of the indicating instrument is reached and a trigger is released, the correct exposure time is obtained via the timer.

Such a device provides the expert with all possibilities of correction and permits also of compensation for the influences caused by the Schwarzschild effect. However, the device presents difficulties for routine examination to be carried out by non-experts, since constant observation and action are required.

The object of the present invention is to create an arrangement for exposure control for microphotography which makes it possible, without substantial increase in the necessary switching expenditure, to obtain optionally the advantages of semi-automatic exposure control and the advantages of automatic exposure control.

This purpose is achieved in accordance with the invention in the manner that the switch member which determines the exposure time contains an integrator and a source of voltage whose output voltage can be adjusted via an operating element; that a switch is provided for selectively connecting the integrator input to the output of said source of voltage or to the output of the signal amplifier; and that one input of a comparator is connected to the output of the integrator, while the other input of the comparator is connected with a threshold control, the output of the comparator being connected with a circuit for control of a shutter.

Between the output of the signal amplifier and the switch there is advisedly provided an adjustable amplifier which serves to bring the voltage level on the associated switch contact (automatic) to the output-voltage level of the variable source of voltage present on the other switch contact (semi-automatic). In this way, assurance is had that upon switching from semi-automatic to automatic exposure control, the subsequent integrator always supplies the same value for the exposure time.

The new arrangement makes it possible to compensate, in semi-automatic operation, for the influences caused by the Schwarzschild effect. For this purpose, the operating element which serves for the simultaneous adjustment of the deflection of the indicating instrument and of the output voltage of the variable source of voltage is advantageously coupled with means for adjustment of the output voltage of the threshold control as a function of the exposure time. This coupling is effected in such manner that, for exposure times of more than a quarter of a second, the output voltage of the threshold control is increased, and exposure time is thus lengthened.

Upon switching to automatic operation, the output of the threshold control is applied to a specific output voltage.

With the new arrangement, it is possible, in simple fashion, to take into consideration different film speeds and to do this both for large-scale and for miniature photography. For this purpose, the signal amplifier contains a switch for setting to the speed of the photographic material used. The switch is advantageously connected with a ring-shaped scale which contains marks for different film speed values and which is settable in reference to a selected one of two fixed indices, for large-picture and for miniature photography.

Figure 2:
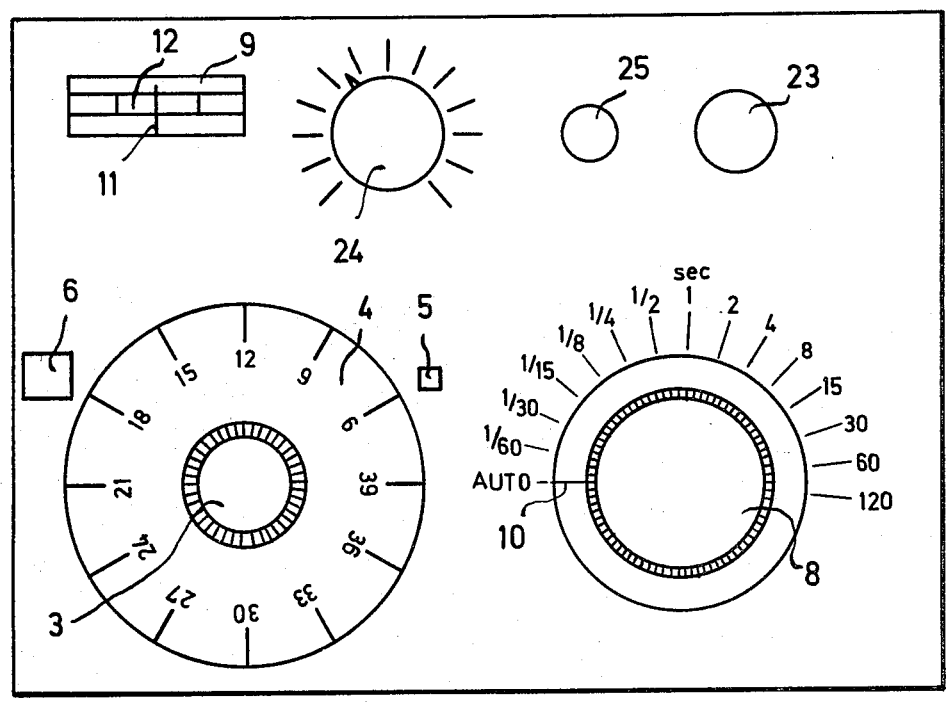

The invention will be explained in further detail below with reference to FIGS. 1 and 2 of the accompanying drawings in which:

FIG. 1 is a circuit diagram schematically indicating components of the new arrangement; and FIG. 2 is a plan view of the operating panel of a housing containing the new arrangement.

In FIG. 1, a radiation receiver 1 is positioned in the ray path of a microscope in the manner shown, for instance, in West German Pat. No. 1,288,425. The signal supplied by this receiver passes to a signal amplifier 2 which is advisedly developed as a high-ohmic operational amplifier with resistors in the negative-feedback branch. A switch 3, shown schematically, serves to select a setting for different film-speed values by changing the resistance in the negative-feedback branch. In the embodiment shown in FIG. 2, switch 3 is a rotary switch connected with an annular disk 4, on which are inscribed values for different film-speeds. Two marks 5 and 6 serve as fixed reading marks for adjustment of disk 4, for microphotography and for large-picture photography, respectively.

The signal which has been converted into a voltage at amplifier 2 is fed to another amplifier 7 which contains a switch 8, shown schematically. The thus-amplified signal voltage is fed from amplifier 7 to an indicating instrument 9.

In FIG. 2, the switch 8 is shown as another rotary switch, having a ring with an index mark 10. Upon rotation of switch 8, the amplification of the amplifier 7 is changed stepwise, the index mark 10 passing over a scale of exposure times, as can be noted in FIG. 2. The indicating instrument 9 is so connected that, at a given step of the switch 8 which corresponds to the signal amplitude, zero deflection is obtained. In this case, the pointer 11 of the instrument 9 in FIG. 2 is over the green sector 12 of the indicator.

A voltage source 13 whose output voltage is variable in stepwise manner via the switch 8a is mechanically coupled with the switch 8, and output voltage from source 13 is fed via contact 14b of a switch 14 to an integrator 15. The latter contains an operational amplifier 17, having a capacitance 16 in its negative-feedback branch. In the at-rest condition, the capacitance 16 is short-circuited by a normally-closed switch 27, i.e., the integrator 15 starts to operate upon an opening of switch 27.

The output signal of integrator 15 is fed to one input 18a of a comparator 18 whose output voltage is fed to relay means 19 for control of the shutter 20.

A further switch 8b, which serves for varying the output voltage of a voltage source 21, is also mechanically connected to the switch 8, said source 21 serving to compensate for the Schwarzschild effect. This effect does not have any detrimental influence in the case of shorter exposure times, so that the output voltage at the output 21b will be understood to be constant for the first (or shorter) exposure steps, up to a quarter of a second; with longer exposure times the output voltage at the output 21b increases and finally, with an exposure time of 120 seconds, reaches ten times the value which it had for an exposure time of one-quarter second. The voltage of the source 21 passes via a switch 22 and another switch member 24 to the input 18b of the comparator 18. In the example shown in FIG. 2, the switch element 24 is shown as operating element of a potentiometer by means of which the voltage of the source 21 is additionally and selectively variable before reaching the input 18b, the variation being in accordance with an empirical value which is related to the selected film material.

To the output of the signal amplifier 2, there is connected an adjustable amplifier 28 which serves to bring the voltage level at the switch contact 14a to the value of the level of the output voltage of the variable voltage source 13.

The two switches 14 and 22 are mechanically coupled to the switch 8. The switches 26 and 27 are mechanically coupled to the operating element 23, which can be developed, for instance, as a push-button.

The manner of operation of the new arrangement is as follows: The operator first of all moves the switch 3 and thereby sets the speed of the film material used with respect to the index 5 or 6, whichever is applicable.

In the "semi-automatic" position shown in FIG. 1, and after the object to be photographed has been inserted into the microscope, the switch 8 is moved step-by-step, until the instrument 9 shows zero deflection. In this connection, the index mark 10 moves over the exposure time scale so that the operator can always immediately note what exposure time is proper for the following photograph. As switch 8 is being moved, so also are the two switches 8a and 8b, and the output voltages of sources 12 and 21 are accordingly set.

In order to start the taking of the photograph, the operator now depresses the button 23, whereby switch 26 is closed and the switch 27 is opened. Upon closing switch 26, the electromagnetically actuated shutter 20 is opened. Upon opening of the switch 27, the integrator 15 becomes active and produces a voltage corresponding to the condition of charge of the capacitor 16 at the input 18a of the comparator 18. As soon as the voltage has reached the same value as the threshold value present at the input 18b, the comparator 18 produces an output voltage which is operative to close shutter 20 via the relay 19.

In order to take a photograph with automatic exposure control, the switch 8 is brought into the "auto" position shown in FIG. 2, at which time switch 14 is at the position of contact 14a and switch 22 connects the output 21a of the voltage source 21 to the comparator input 18b, thus establishing at output 21a a fixed voltage, i.e., a pre-established threshold value. Since the voltage level at the two contacts 14a and 14b of the switch 14 is the same, the act of initiating the exposure by depressing button 23 is operative to cause integrator 15 to deliver to the input 18a of the comparator 18 the same signal as in the "semi-automatic" position described above. The Schwarzschild effect cannot be taken into consideration in the "automatic" position; a voltage which corresponds to the voltage at the output 21b for an exposure time of one quarter second is present at the output 21a of the source of voltage 21.

In FIG. 2, 25 is a pilot lamp which lights up during the opening of the shutter 20, the same being operable as by back contacts (not shown) forming part of the relay means 19.

What is claimed is:

1. In exposure-control apparatus for use in microphotography in which the signal produced by a radiation receiver is converted by a signal amplifier into a voltage and is fed via an interposed network to an indicating instrument, and in which there is provided an operating element by which the network may be modified until a predetermined deflection of the instrument is obtained, and with which at the same time relay means which determines the exposure time is so adjusted that upon the subsequent release to initiate the exposure, said relay is operated for the correct exposure time, the improvement in which said relay means includes an integrator and a source of selectively variable voltage, selectively operable switch means for selective connection of the integrator input to the output of said voltage source or to the output of said signal amplifier, and comparator means having a first input connected to the output of said integrator and a second input including threshold-control means, and an exposure-control relay connected to the output of said comparator, said threshold-control means including a second voltage source having an operating element for selective variation of second-source voltage, said operating elements being interconnected for adjustment of the threshold output voltage of the threshold-control means in coordination with modification of said network, thereby modifying said threshold output voltage as a function of the exposure time determined upon achievement of said predetermined deflection.

2. The improvement of claim 1, in which said signal amplifier is selectively variable and includes control means calibrated for predetermined setting in accordance with photographic-film speed.

3. In exposure-control apparatus for use in microphotography in which the signal produced by a radiation receiver is converted by a signal amplifier into a voltage and is fed via an interposed network to an indicating instrument, and in which there is provided an operating element by which the network may be modified until a predetermined deflection of the instrument is obtained, and with which at the same time relay means which determines the exposure time is so adjusted that upon the subsequent release to initiate the exposure, said relay is operated for the correct exposure time, the improvement in which said relay means includes an integrator and a source of selectively variable voltage, selectively operable switch means for selective connection of the integrator input to the output of said voltage source or to the output of said signal amplifier, and comparator means having a first input connected to the output of said integrator and a second input including threshold-control means, and an exposure-control relay connected to the output of said comparator, said source of variable voltage having an operating element for selective variation of a first source-voltage output, and said threshold-control means including a second voltage source having an operating element for selective variation of second source-voltage output, said operating elements being interconnected for coordination (a) of first-voltage supply to said comparator means via said integrator and (b) of second-voltage supply to said comparator means via said threshold-control means.

4. The improvement of claim 3, in which said switch means is so interconnected with said operating elements that said switch means is operative to change from one to the other of its selective connections at one limit of the range of selective operability of said operating elements.

5. The improvement of claim 4, in which a selectively rotatable member interconnects said operating elements for single-rotation control of first and second source voltages as a function of exposure time determined upon achievement of said predetermined deflection, said switch means being in its "semi-automatic" condition while and wherein it is operative to supply operating-element controlled first and second source voltages via said integrator and threshold-control means throughout said range, and said switch means being operated upon member rotation out of said range and at said limit to change from its "semi-automatic" to "automatic" condition wherein it is operative to connect the integrator input to the output of said signal amplifier.

6. The improvement of claim 5, wherein said threshold-control means includes an output connection providing a predetermined fixed-voltage output, and wherein said fixed-voltage output is connected to said comparator means via said switch means when said switch means is in its condition connecting the integrator input to the output of said signal amplifier.

7. In exposure-control apparatus for use in microphotography in which the signal produced by a radiation receiver is converted by a signal amplifier into a voltage and is fed via an interposed network to an indicating instrument, and in which there is provided an operating element by which the network may be modified until a predetermined deflection of the instrument is obtained, and with which at the same time relay means which determines the exposure time is so adjusted that upon the subsequent release to initiate the exposure, said relay is operated for the correct exposure time, the improvement in which said relay means includes an integrator and a source of selectively variable voltage, selectively operable switch means for selective connection of the integrator input to the output of said voltage source or to the output of said signal amplifier, and comparator means having a first input connected to the output of said integrator and a second input including threshold-control means, and an exposure-control relay connected to the output of said comparator, said threshold-control means including an output connection providing a predetermined fixed-voltage output, and said fixed-voltage output being connected to said comparator means via said switch means when said switch means is in its condition connecting the integrator input to the output of said signal amplifier.

* * * * *